UNITED STATES PATENT OFFICE.

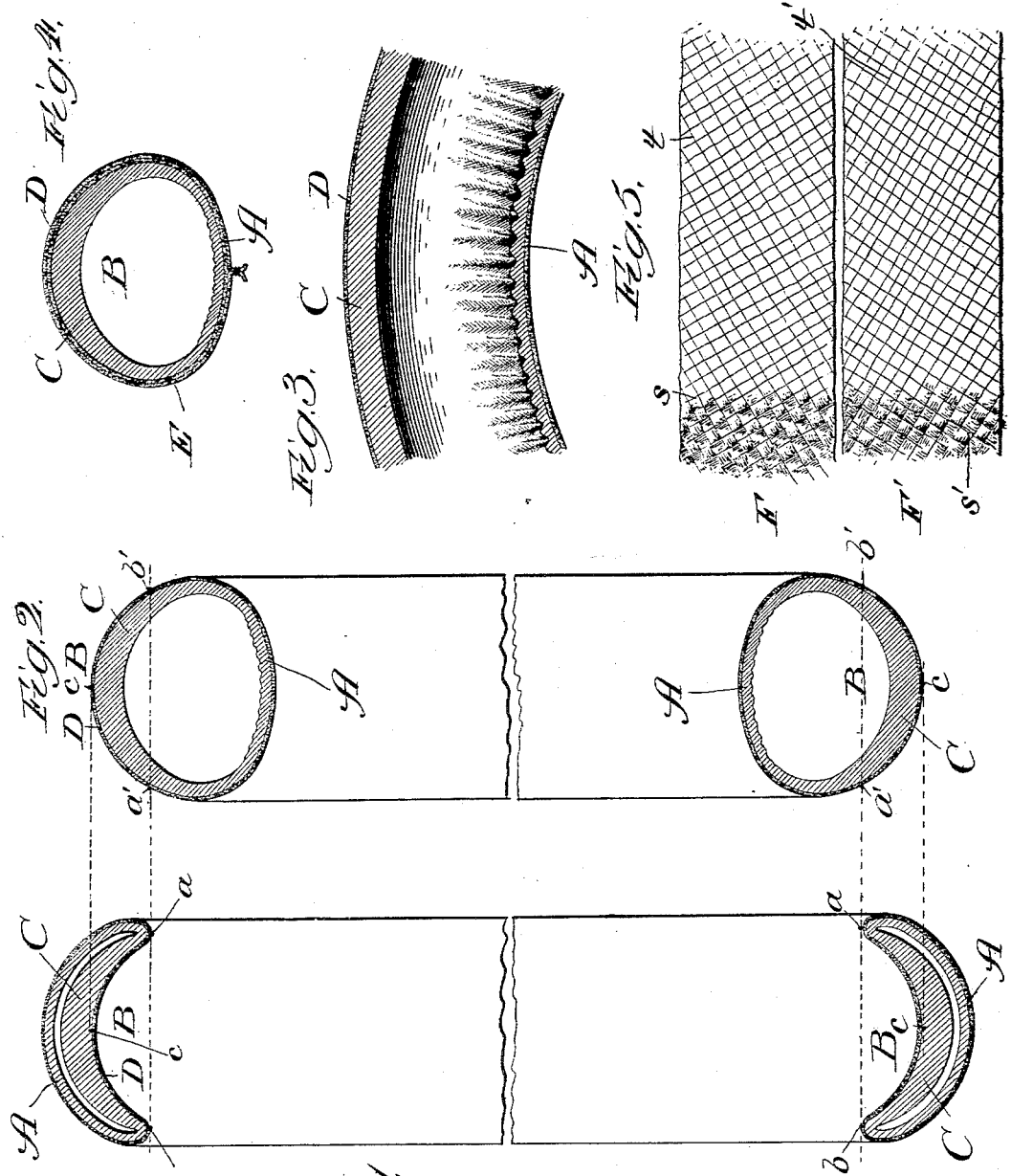

JOHN F. PALMER, OF RIVERSIDE, ILLINOIS.

PNEUMATIC TIRE.

SPECIFICATION forming part of Letters Patent No. 476,680, dated June 7, 1892.

Application filed April 12, 1892. Serial No. 428,822. (No model.)

*To all whom it may concern:*

Be it known that I, JOHN F. PALMER, a citizen of the United States, residing at Riverside, in the county of Cook and State of Illinois, have invented a new and useful Improvement in Pneumatic Tires for Bicycles, of which the following is a specification.

My invention relates to pneumatic tires for bicycles, &c., and is more particularly related to the manufacture of such tires having a continuous ring-shaped tube for air and a tread portion made of thickened and compressed rubber for the double purpose of giving an increase of material at the point of greatest wear and to give to the tire the property of automatically closing any punctures that might otherwise permit the expulsion of the contained air.

In Letters Patent of the United States No. 467,642, granted to me January 26, 1892, I have described and claimed a successful method of applying to a pneumatic tire a tread of compressed rubber, the compression being effected through the medium of an inelastic or substantially non-stretching backing, and this invention has proved entirely successful.

In the application for Letters Patent filed by me January 8, 1892, Serial No. 417,342, I have described and claimed an improvement in pneumatic tires whereby the rubber of the inner tube is compressed, densified, or tensioned, the terms being intended synonymously to describe the condition of the rubber when having its curvature reversed while its outer surface is held from stretching, and I have in that application laid broad claim to such a product.

My present invention is in one view an application of the specific mode of manufacture described in that patent and application to the production of a tire the air-tube proper of which shall have a thickened and compressed tread portion. It has heretofore been suggested by myself and others that this property may be given to a pneumatic tire by a manipulation of the tube before the same is formed into the necessary ring shape and before it has been inflated, and it has also been suggested that this character may be given to the tire by forming the same into a ring with a concavo-convex initial shape to the tread, and thereupon by the expansion of introduced air force outward the concavo-convex tread to a convex form. In order to bring about the compression in the rubber, however, it is quite clear that a substantially non-extensible backing must be provided to the thickened portion of the tread, and in endeavoring to carry out this method of operation it is found that the change of the non-extensible backing from a concave to a convex form is impossible, because it would involve the extension of the canvas 3.1416 inches for every radial inch involved in the change from concave to convex. In other words, it being borne in mind that in order to produce compression by inflation the tube must be made complete in the form of a ring and the non-extensible backing will, therefore, have an unvarying diameter, any method of operation which necessitates the increase in the diameter of the non-extensible backing to produce compression must be discarded, and the use of an extensible backing fails to produce compression of the thickened portion of the tube.

So far as I am aware no pneumatic tire has yet been produced, although it has been suggested, as above mentioned, in which a thickened thread portion has been given to the tire compressed after the formation of the tube into a ring.

It is a principal object of my invention to produce a tire having these characteristics and incidentally to supply a method of applying a flexible fibrous material, like canvas, in such a manner as to afford a compensation in tautness between the circumference and the inner point of the tube.

My invention consists in forming a pneumatic tire of flexible material with a radial inner portion thickened and given throughout a concavo-convex or wholly or partially collapsed form, applying to the thickened concave inner surface a strip or ring of substantially non-extensible fabric, such as canvas, said canvas ring having the diameter of the intended outside diameter of the tire, and thereupon by a twisting operation turning the ring throughout its circumference to an inverted position, whereby the canvas strip shall be outside and the soft rubber or other tube shall be within the canvas—that is to say, between it and the center of the wheel. In this manner, the canvas not being extended, it presents on reversal the same diameter as before, while the thickened rubber portion, being held thereto and prevented from expanding, is compressed by reason of being changed from a concave to a convex curvature. It is true, also, that the remainder of the tube or that nearest the felly when applied is crimped to a greater or less extent; but this is not deemed objectionable, as the subsequent external covering of canvas which is always applied to this species of tire disguises the appearance, and the inherent strength and resiliency of the tire is not reduced.

It will be observed that no effort is made to utilize the introduced pneumatic pressure for bringing about this compression, and the reason may be asserted, broadly, to be that it is deemed undesirable to utilize the air to effect the compression, and thus close any apertures, inasmuch as when an aperture shall be formed the tendency of the air to escape will counteract its tendency to produce a compression of the rubber, and in exact proportion as pressure is lost the ability of the compressed tubing of preventing further loss is reduced. Hence in the mode of manufacture which I prefer the change in the curvature of the rubber-carrying canvas is alone relied upon, regardless of the condition of air-pressure within the tube.

It is quite apparent that means must be provided for giving to the canvas a substantially non-stretching character until some material shall be found which, while flexible and strong in cross-section, is also non-stretching longitudinally. At the same time it is quite apparent that unless each strip of canvas shall be separately woven on a convex and ring-shaped form some means must be devised for giving to the inner radial points of the canvas a shorter length than is given to the middle or outer radial points, because when applied to the tire if the length were the same at the side as at the circumference the side being nearer the center would pucker, or, at least, would not be stretched to its full limit. It is part of my invention to provide for this requirement by cutting the canvas strips on the "bias," so to speak—that is, with the fibers running diagonally of the strip. It is deemed desirable, however, that one of the fibers shall present an acute angle, while the cross-fiber presents an obtuse angle, the latter fiber being at right angles to the long fiber. In order to give the necessary strength to the canvas so cut, and more particularly to reduce the stretching to a minimum, I provide two strips of canvas, one superimposed upon the other, each cut diagonally, but having the fibers inclined in opposite directions—that is, while the long fiber of the under one will incline from right to left the long fiber of the upper one will incline from left to right. In this way it is found that when either strip is stretched to its limit a greater amount of stretching is affected at the middle point than at the edges, the difference being such as exactly to compensate for the difference in diameter between the circumferential and inner side of the ring-shaped tube. Any tendency after such stretching to further stretching in either strip is antagonized by the resistance of the other strip, and hence a practically non-stretching cover is obtained.

In the drawings, Figure 1 is a sectional edge view of a rubber tube in the form of a ring as the same appears before it has been converted into a tire having an external thickened compressed tread portion. Fig. 2 is a similar view of a tire after the same has been converted into the proper form for use. Fig. 3 is a side elevation of a section of a tire, partly broken away, representing the appearance of the tube after it has been compressed at the tread portion in accordance with my invention. Fig. 4 is a transverse section taken through the tube, showing its appearance after it has been completed and the external canvas covering applied; and Fig. 5 is a plan view of two strips of canvas, showing the mode of cutting the same to produce a non-extensible backing.

A represents the flexible part of the tube, and B the tread portion. The air-space of the tube is confined between the walls afforded by the flexible part A and thickened part B, the latter, as shown at C, being composed of compressible rubber of a width sufficient substantially to cover the tread portion of the finished tire.

D represents the non-extensible canvas, and E the final envelope of canvas, which is usually applied to the tire after it has been formed. Outside of this is usually provided a further protective coating of rubber or rubber and canvas.

The operation of forming the tire, as illustrated in Figs. 1 and 2, is as follows: The rubber tube A B is given a diameter over all slightly in excess of the intended diameter of the wheel. For instance, if the intended diameter of the wheel, including the tire, is twenty-eight inches the tube is made of an external diameter of twenty-eight and one-half inches, or thereabout. The inner surface of the tube A B is collapsed to the concavo-convex form shown in Fig. 1, and to this concave face is applied a strip of substantially non-extensible canvas or other fabric D. The canvas strip D has the diameter of the intended external diameter of the wheel—say twenty-eight inches—and being non-extensible it will retain this diameter in the subsequent manipulations. Thereupon the tube is turned upon itself, so that the part A shall be between the circumference and the center and the part B shall be at the circumference. This is done by commencing the inverting at a point upon the ring, continuing it around the ring by a sort of twisting operation until completed, the result being that the edge $a$ found in Fig. 1 becomes the edge $a'$ of Fig.

2 and the edge $b$ of Fig. 1 becomes the edge $b'$ of Fig. 2, while the central point $c$ of the canvas becomes the central point $c'$ in the other figure. In the finished tire it is thus found with the inclined portion C, which was formerly convex, Fig. 1, becomes reversed in its curvature, and hence concave, as illustrated in Fig. 2. This change of the curvature produces the requisite compression to cause the rubber automatically to close any apertures that may be formed in it by perforation in the same manner as is accomplished by the compressed rubber in my previous Letters Patent referred to. The part A, which is substantially smooth before reversal, as shown in Fig. 1, becomes slightly crimped by reason of reducing it from a diameter of twenty-eight and one-half inches, or thereabout, to a diameter of twenty-six inches, or thereabout; but this crimping is not deemed objectionable, as it in no manner interferes with the strength or resiliency of the tubing, and it is subsequently hidden by the envelope E, of canvas, when applied, as before stated.

To give to the curved canvas ring a non-stretching character when not provided for in the manufacture of the fabric, I cut two strips F F', one F' of which is composed of fibers $t\ s$, the former having an acute angle to a longitudinal middle line and the latter at right angles to the fiber $t$, and hence presenting an obtuse angle to this line. The strip F' is the exact opposite of the strip F, the fibers $t'$ and $s'$ being provided in the same manner as before; but when brought together the strips are placed back to back, so that the fibers $t'$ in the strip F' present the opposite angles to the fibers $t$ in the strip F, the measurement of the angles being, however, substantially the same. It is found that when a strip F F' is stretched upon a curved mandrel the edges are drawn inward to compensate for the lineal extension at the center, and that the actual length of the edges of the strip is less than the length at the center, the proportion being such as to bring about a substantial compensation in the tautness of the strip in the form of a tube or partial tube made into a ring. It is quite apparent that the number of strips F F' may be increased, as desired, to afford increased strength with the same result. In order to bring about a uniformity in action in the strips, it is preferred to secure them together by vulcanization or some similar process in the usual manner before applying them to the tire.

Having thus explained in a general way the essential features of my improved method of forming the tires, I may state that in practice I have found it convenient to observe the following order in building up the tire before vulcanization: First, to apply to a mandrel in the form of a ring, round in cross-section, a strip or strips of canvas cut in the manner before described and saturated with rubber, with which is combined the necessary ingredients to produce vulcanization, thereupon to attach to the canvas, curved and made continuous in the manner before stated, a strip of thickened soft rubber in one or more layers, as desired, and also supplied with the necessary ingredients to effect vulcanization, thereupon to apply a collapsed tube of soft rubber so attached to the thickened rubber by its inherent adhesiveness, soapstone, flour, or similar substance in the form of a powder being introduced into the tube to prevent adhesion of the two walls during the process of vulcanization. In place of introducing a foreign substance, like soapstone, air may be introduced to separate the walls of the tube while vulcanization is taking place, the purpose being merely to make certain the formation of the hollow tube when the tire is completed. After the parts have been thus applied the tire may or may not be placed in a mold, wrapped with canvas in the usual manner, or simply placed in a vulcanizing-oven and subjected to the necessary heat to affect vulcanization. When the vulcanization is complete, the ring is composed of a tube the outer or peripheral side of which is capable of being readily crimped, while the inner or hub side is concave and thickened and provided with a hub-side covering of flexible and substantially non-stretching material. To produce the tire from this structure, the tube is turned by a twisting operation continued throughout the ring, so that the thickened canvas-covered side is changed from the hub side to the periphery, as already described. The effect of changing the canvas, made curved in cross-section and endless, the canvas being of a nature to resist stretching in a great measure, is to reverse the curvature of the canvas, and hence of the thickened rubber vulcanized thereto. This reversal of curvature of the rubber need not extend to an exact opposite curvature, for the tread in some cases will prove entirely satisfactory when made only slightly convex. The completed tire thus formed with the usual external covering of canvas and rubber and before inflation may then be applied to the wheel and inflated in the usual manner through a valved air-tube temporary or permanent in its character, or, as has been suggested, by the introduction of a puncturing-tube attached to an air-pump through the thickened portion or tread.

It is found that a tire made in accordance with my invention, as hereinbefore described, presents at the tread portion an inherent tendency to close any apertures that may result from perforation, whether the perforation occurs in charging with air or subsequently.

What I claim as new, and desire to secure by Letters Patent, is—

1. A tube for forming a pneumatic tire, having before completion an endless tubular concavo-convex form with its body thickened on the concave side and provided with a continuous strip of substantially non-stretching material on the exterior at the concave side, substantially as described.

2. The method of producing, in a pneumatic tire, a compressed and thickened tread portion, which consists in forming a tubular ring of rubber, thickened on the hub side and having applied thereto a substantially non-stretching ring of fabric, thereupon inverting the relation of parts, so that the non-stretching fabric shall be on the tread portion, thereby compressing the thickened body of rubber, substantially as described.

3. The method of forming a pneumatic tire with a thickened and compressed tread portion on the internal tube, which consists in building the tube in the form of a ring out of soft rubber with a hub-side layer of substantially non-stretching fabric, thereupon vulcanizing the product and inverting the curvature of the fabric and attached parts, substantially as described.

4. The method of forming a pneumatic tire with a thickened and compressed tread portion on the interior tube, which consists in forming a ring of canvas having the intended curvature of the tread, applying to its convex face a thickened body of rubber, and then applying an endless tube of rubber having in one-half a collapsed concavo-convex outline to conform to the convexity of the thickened rubber, producing vulcanization in the parts, and thereupon reversing the curvature of the fabric and attached parts with intermediate or subsequent inflation, substantially as described.

5. The method of making strips of fabric substantially non-stretching for use in forming a pneumatic tire, which consists in applying together oppositely-cut strips of fabric, each strip having its fibers diagonally arranged with a long fiber on an acute angle and a short fiber on an obtuse angle, whereby stretching of the strip produces a curvilinear form, and when thus produced further stretching in either strip is substantially prevented by the resistance of the other, substantially as described.

6. A pneumatic tire having an outer thickened tread portion of rubber inverted and held in position by a substantially non-stretching backing composed of two or more superimposed attached layers of diagonally-cut fabric, the fiber in alternate layers being arranged in opposite directions, substantially as set forth.

JOHN F. PALMER.

In presence of—
W. N. WILLIAMS,
J. N. HANSON.